(12) United States Patent
Albers et al.

(10) Patent No.: US 6,382,649 B1
(45) Date of Patent: May 7, 2002

(54) WHEEL SUSPENSION IN A MOTOR VEHICLE

(75) Inventors: Hartmut Albers, Stuttgart; Gunter Fischer, Esslingen; Rainer Hack, Brackenheim; Dirk Siebelt, Aichwald; Markus Steffens, Winnweiler, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/616,727

(22) Filed: Jul. 14, 2000

(30) Foreign Application Priority Data

Jul. 16, 1999 (DE) .......................................... 199 33 432

(51) Int. Cl.[7] .............................................. B60G 11/02
(52) U.S. Cl. ........................... 280/124.17; 280/124.131
(58) Field of Search ..................... 280/124.17, 124.175, 280/124.165, 124.166, 680, 686, 124.128, 124.131, 124.153, 124.164; 267/260, 261

(56) References Cited

U.S. PATENT DOCUMENTS

| | | | | |
|---|---|---|---|---|
| 3,277,975 A | * | 10/1966 | Van Winsen | 180/359 |
| 3,498,631 A | * | 3/1970 | Van Winsen | 280/124.153 |
| 3,672,698 A | * | 6/1972 | Froumajou | 280/124.153 |
| 3,842,926 A | * | 10/1974 | Williams et al. | 180/8.6 |
| 3,904,219 A | * | 9/1975 | Guerriero | 280/124.177 |
| 4,625,995 A | * | 12/1986 | Aubry et al. | 280/124.128 |

FOREIGN PATENT DOCUMENTS

| | | |
|---|---|---|
| DE | 35 24 077 A1 | 1/1987 |
| DE | 38 19 162 C2 | 12/1990 |
| DE | 44 45 995 C1 | 4/1996 |
| WO | WO 94/18019 | 8/1994 |

* cited by examiner

Primary Examiner—Paul N. Dickson
Assistant Examiner—Faye M. Fleming
(74) Attorney, Agent, or Firm—Kenyon & Kenyon

(57) ABSTRACT

A suspension for a wheel in a motor vehicle, such as a passenger car, having a link which is made of fiber composite and is mounted at one end, by means of a mounting, on a chassis of the vehicle and at the other end holds the wheel, and having spring means which are made of fiber composite and support the link on the chassis in a resilient manner. In order to obtain a particularly compact construction for the wheel suspension, the mounting has a bearing in which a bearing part, which is fastened to the chassis, is mounted such that it can be adjusted relative to a bearing part, which is fastened to the link, by pivoting about a pivot axis, and the spring means having a torsion-bar suspension which extends coaxially to the pivot axis and is fastened at one end to the chassis or to the bearing part fixed to the chassis, and is fastened at the other end to the link or to the bearing part fixed to the link.

40 Claims, 2 Drawing Sheets

WHEEL SUSPENSION IN A MOTOR VEHICLE

FIELD OF THE INVENTION

The invention relates to a suspension for a wheel in a motor vehicle, in particular in a passenger car.

BACKGROUND OF THE INVENTION

A conventional wheel suspension of this type has a link which is designed as a longitudinal link and is mounted at one end, by means of a mounting, on a chassis of the vehicle and on which the wheel is held at the other end. In addition, a wheel suspension of this type usually has spring means which support the link on the chassis in a resilient manner. In order to be able to accommodate spring means of this type in the wheel suspension, the overall space required for this purpose has to exist. This insulation space is often not available, in particular in small cars.

The present invention is concerned with the problem of specifying an embodiment for a wheel suspension of the type mentioned at the beginning which requires a small installation space.

SUMMARY OF THE INVENTION

According to the invention, this problem is solved by a wheel suspension having the features of claim 1. Designing the spring means as a torsion-bar suspension enables a construction managing with a relatively small installation space to be realized for the wheel suspension.

A particularly compact construction results if the torsion-bar suspension is formed from two torsion-bar springs which are connected in series and are arranged coaxially to each other, at least one torsion-bar spring being of tubular design and surrounding the other torsion-bar spring concentrically.

In an advantageous development, a torsion-bar stabilizer made of fiber composite can be provided, which stabilizer is of tubular design, extends coaxially to the pivot axis of the link on the chassis, surrounds the torsion-bar suspension concentrically, and is fastened at one end directly or indirectly to the link of the wheel suspension and is fastened at the other end directly or indirectly to a link of a second wheel suspension which is of corresponding construction and lies opposite on the same vehicle axle. In this manner, the two Wheel suspensions of an axle are positively coupled to each other, which enables a stabilizing action to be obtained for the vehicle body in the event of load changes, particularly when cornering.

According to an advantageous embodiment, the link can be designed as a leaf-spring suspension which is preferably of U-shaped design and has two spring legs which run essentially equidistantly from each other and are connected at one end to a bearing part, fixed to the link, of a mounting which mounts the link on the chassis and are connected at the other end to each other via a web on which the wheel is held. In this manner, the link itself forms a further spring means for supporting the wheel on the chassis. Particularly expedient suspension characteristics can be produced by the series connection of the leaf-spring suspension and the torsion-bar suspension. In particular, the leg springs can be provided with an S-shaped precurvature which extends the link when the wheel is loaded vertically, i.e. when it is deflected inwards, and shortens it when the wheel is relieved of load, i.e. when it rebounds. This measure enables the relative position of the wheel on the chassis to be varied dynamically and specifically in an advantageous manner, i.e. as a function of the forces occurring on the vehicle.

Further important features and advantages of the wheel suspension according to the invention emerge from the subclaims, from the drawings and from the associated description of the figures with reference to the drawings.

It goes without saying that the abovementioned features and those features which are still to be explained below can be used not only in the combination specified in each case, but also in other combinations or on their own without departing from the scope of the present invention.

BRIEF DESCRIPTION OF THE DRAWINGS

Preferred exemplary embodiments of the invention are illustrated in the drawings and are explained in greater detail in the description which follows.

In the drawings, in each case schematically.

DETAILED DESCRIPTION OF THE INVENTION

Figure 1:
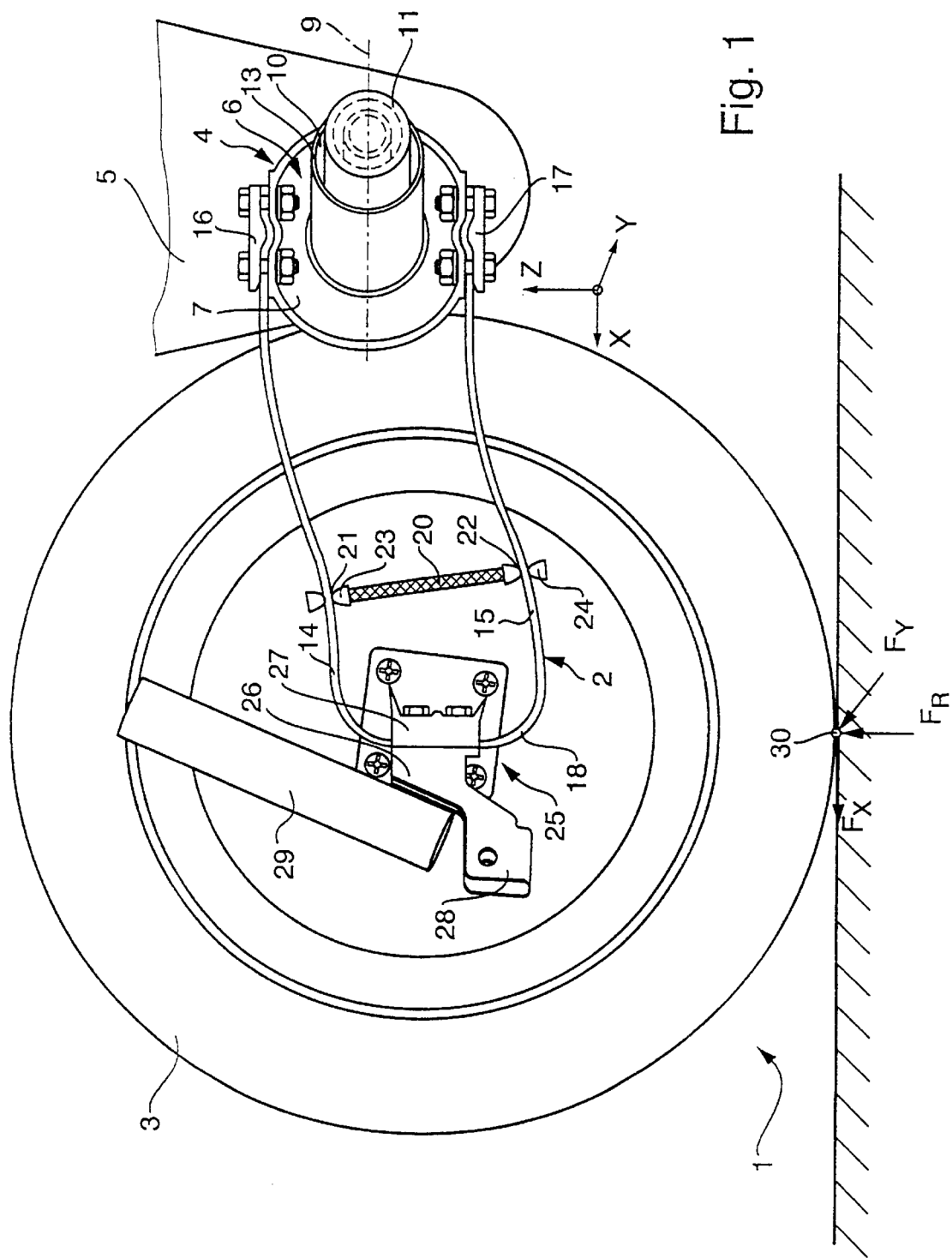
FIG. 1 shows a simplified side view of a wheel suspension according to the invention.
Figure 2:
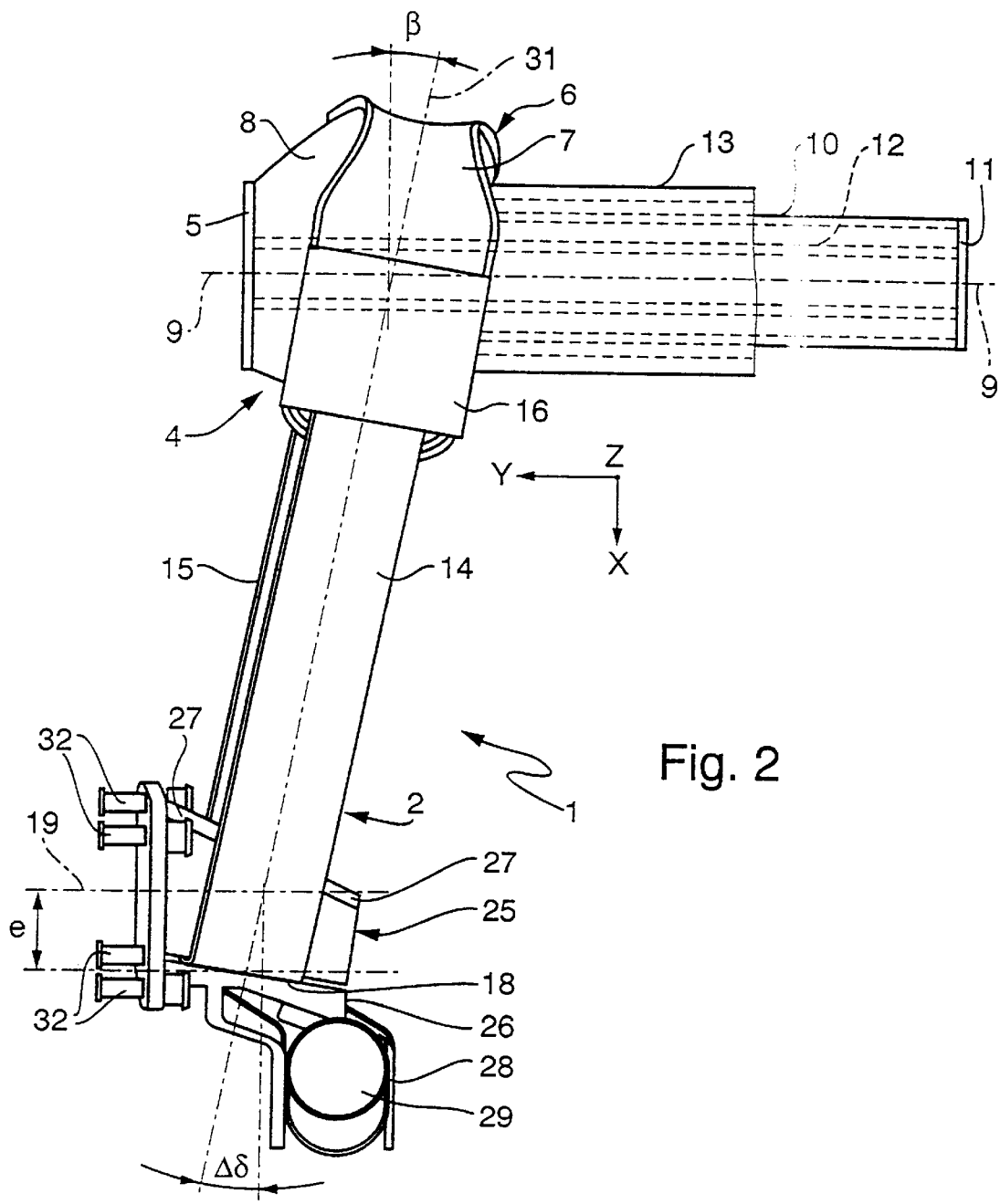
FIG. 2 shows a simplified plan view of the wheel suspension according to FIG. 1.

According to FIGS. 1 and 2, a wheel suspension 1 has a link 2 which is designed as a U-shaped leaf spring and extends essentially in a longitudinal direction or in the direction of the longitudinal axis X of a vehicle (otherwise not illustrated). The link 2 accordingly forms a longitudinal link. The link 2 holds a wheel 3 at an end on the left according to FIG. 1, the associated wheel mounting being omitted in the figures and -being able to be designed -in a conventional manner. At its other end which is on the right according to FIG. 1, the link 2 is mounted, by means of a mounting 4, on a chassis 5 (merely indicated) of the vehicle.

This mounting 4 is formed by bearing 6 which has at least two bearing parts 7 and 8. The link 2 is fastened to one bearing part 7, while the other bearing part 8 is fastened to the chassis 5. The bearing part 7 which is fixed to the link is mounted on the bearing 6 in a manner such that it can pivot about a pivot axis 9 relative to the bearing part 8 fixed to the chassis. This enables the link 2 to carry out pivoting movements about the pivot axis 9. The pivot axis 9 runs parallel to a transverse direction or transverse axis Y of the vehicle.

In addition, the wheel suspension 1 according to the invention has a tubular first torsion-bar spring which extends coaxially to the pivot axis 9 and is fastened by an axial end in a rotationally fixed manner to the bearing part 7 fixed to the link. A disc-shaped coupling member 11 is fastened, in particular welded, to the first torsion-bar spring 10 at its other axial end. This first torsion-bar spring 10 is connected in series with a second torsion-bar spring 12 which, for this purpose, is likewise fastened, in particular by welding, to the coupling member 11 by an axial end. At its other axial end, the second torsion-bar spring 12 is fastened to the chassis 5 or to the bearing part 8 fixed to the chassis. The second torsion-bar spring 12 is likewise designed as a tube here and extends coaxially and concentrically in the interior of the first torsion-bar spring 10. This results in a particularly compact torsion-bar suspension for the link 2.

A tubular torsion-bar stabilizer 13 is arranged coaxially to the torsion-bar suspension, which stabilizer surrounds the torsion-bar springs 10 and 12 concentrically and is fastened at one end to the bearing part 7 fixed to the link and, in the case of a second wheel suspension (not illustrated) which is of corresponding construction and is arranged lying opposite on the other side of the vehicle on the same vehicle axis is likewise fastened at the other end to the bearing part which is provided there and is fixed to the link. The torsion-bar stabilizer 13 therefore forms a positive coupling of the wheel suspensions which enables the chassis 5 to be stabilized in an advantageous manner in terms of vehicle dynamics in the event of load changes, for example when cornering.

The torsion-bar springs 10, 12 and the torsion-bar stabilizer 13 preferably have a cylindrical form, in particular a circular cylindrical form.

The U-shaped leaf-spring suspension which is formed by the link 2 has two spring legs 14 and 15 which essentially run at a constant distance from each other and which are fastened at their bearing-side ends to the bearing part 7 fixed to the link. For this purpose, the free ends of the spring legs 14 and 15 are each clamped to the bearing part 7 fixed to the link by means of a respective clamping plate 16 or 17 using a screw connection. At their wheel-side ends, the two spring legs 14 and 15 are connected to each other via a common web 18. The spring legs 14 and 15 can, in particular, be produced as one piece together with the web 18.

The spring legs 14 and 15 are provided with an S-shaped precurvature which, in the event of an upwardly directed, vertical load on the wheel 3, i.e. in the event of a wheel load $F_R$ where the wheel 3 is deflected inwards, causes a relative movement by means of which the link 2 is extended in the longitudinal direction X of the vehicle, so that the distance between a wheel axis 19, about which the wheel 3 rotates, and the pivot axis 9 is increased. This kinematic arrangement can have a positive effect on the steering performance of the vehicle.

A supporting element 20 can be arranged at least at one point between the two spring legs 14 and 15, which supporting element is supported on each of these spring legs 14 and 15 in such a manner that it can carry out pivoting movements thereon about a spindle 21 or 22 running transversely to the longitudinal extent of the spring legs 14 or 15. For this purpose, the supporting element 20 is fixed to the spring legs 14 and 15 by means of suitable clamping elements 23 and 24, respectively. The supporting element 20 extends between the spring legs 14 and 15 preferably transversely to their longitudinal extent. A supporting element 20 of this type causes the leaf-spring suspension formed by the link 2 to be stabilized.

The two spring legs 14 and 15 of the leaf-spring suspension (link 2) are designed at least in some sections as carriers which are subject to bending and which each have the same direct bending stress. For a this purpose, the spring legs 14 and 15 are preferably designed as rectangular, parabolic, hyperbolic or tapered leaf springs.

A wheel holder 25 is fastened to the web 18, the said wheel holder in the present embodiment being formed from two components, namely from a first holding part 26 and from a second holding part 27 which receive the web 18 between them, clamp it by means of a corresponding screw connection and fix it in place. A cutout for receiving the web 18 is preferably formed in one of the two holding parts 26 or 27 in order thereby to obtain a positive-locking connection of the web 18 to the holder 25. Integrally formed on the first holding part 26 is a carrier 28 to which a shock absorber 29 is coupled and is thereby supported on the link 2. The connection between the shock absorber 29 and associated carrier 28 can be configured in a conventional manner and is omitted here in order to maintain the clarity. At its end facing away from the carrier 28, the shock absorber 29 is supported on the chassis 5 in a conventional manner. Since a support of this kind is also generally known, it is not illustrated in the figures. The second holding part 27 is used for the fastening, for example by means of a screw connection 32, of a reel mounting (not illustrated) on which the wheel 3 is mounted in a conventional manner.

The shock absorber 29 is preferably arranged in such a manner that it absorbs and supports torques resulting from a lateral force $F_y$ transmitted into the wheel 3 at a wheel contact point 30 in the transverse direction Y of the vehicle. The shock absorber 29 is, moreover, preferably arranged in such a manner that during the inwards deflection of the wheel 3 a defined change in camber develops accompanied by twisting of the leaf-spring suspension 2.

According to FIG. 2, the link 2 is arranged in such a manner that its longitudinal axis 31 is inclined by an angle β with respect to the longitudinal direction X of the vehicle. By means of this measure, the chassis-side end of the link 2 is arranged further inwards with respect to a central plane of the vehicle than the wheel-side end of the link 2. This firstly results in a relatively large clearance for the steering angle of the wheel 3 and secondly, the lever ratios acting on the link 2 are influenced, which enables a desired kinematic arrangement of the suspension for the wheel 3 to be formed. In addition, this arrangement has the result that the length of the link or the distance between the wheel axis 19 and pivot axis 9 is enlarged if lateral forces $F_y$ act inwards on the wheel 3 from the outside. This means that the kinematic arrangement predetermined in this manner produces a specific understeer or oversteer of the particular wheel 3.

The second holding part 27 is designed in such a manner that a distance e is formed between the web 18, to which the wheel holder 25 is fastened, and the wheel axis 19. This distance e has the effect that lateral forces $F_y$ acting on the wheel 3 cause the web 18 to rotate about a vertical axis, as a result of which a change in track A5 for the wheel 3 arises.

The leaf-spring suspension, i.e. the link 2, and the spring legs 14, 15 and the torsion-bar springs 10, 12 and the supporting elements 20 and the torsion-bar stabilizer 13 are produced from a fiber composite. In this case, it is possible to produce the web 18 of the leaf-spring suspension 2 from a different material to the spring legs 14 and 15. It is likewise possible for the web 18 of the leaf-spring suspension 2 to have a different material construction to the spring legs 14 and 15. The leaf-spring suspension 2, i.e. the link 2, is preferably produced in a prepreg-layering process. It is likewise possible to produce the leaf-spring suspension 2 using a resin-injection process or a production process derived therefrom. The torsion-bar springs 10 and 12 and also the torsion-bar stabilizer 13 can be produced, for example, using a winding process or a braiding process. The strut-like supporting elements 20 are preferably produced by reshaping thermoplastic fiber-composite semi-finished products.

What is claimed:

1. Suspension for a wheel in a motor vehicle, having a link which is mounted at one end, by means of a mounting, on a chassis of the vehicle and at the other end holds the wheel, and having spring means which are made of fiber composite and support the link on the chassis in a resilient manner, the mounting having a bearing in which a bearing part, which is fastened to the chassis, is mounted such that it can be adjusted relative to a bearing part, which is fastened to the link, by pivoting about a pivot axis, and the spring means having a torsion-bar suspension which extends coaxially to the pivot axis and is fastened at one end to the chassis or to the bearing part fixed to the chassis, and is fastened at the other end to the link or to the bearing part fixed to the link, characterized in that the link consists of fiber composite, in that the link is designed as a leaf-spring suspension, and in that the leaf-spring suspension is of U-shaped design and has two spring legs which run essentially equidistantly from each other and are fastened at one end to the bearing part fixed to the link and are connected at the other end to each other via a web on which the wheel is held.

2. A suspension as set forth in claim 1, wherein the leaf-spring suspension or the spring legs has/have an S-shaped precurvature which extends the link when the wheel is loaded vertically and shortens it when the wheel is relieved of load.

3. A suspension as set forth in claim 1, wherein the spring legs of the leaf-spring suspension are designed in some areas as carriers which are subject to bending and have the same direct bending stress.

4. A suspension as set forth in claim 2, wherein the spring legs of the leaf-spring suspension are designed in some areas as carriers which are subject to bending and have the same direct bending stress.

5. A suspension as set forth in claim 1, wherein the at least one strut supporting element is arranged between the spring legs, the said supporting element being mounted on each spring leg in a manner such that it can pivot about a spindle running perpendicularly to the longitudinal direction of the spring leg the supporting element extending longitudinally between the spring legs perpendicularly to a longitudinal extent of the spring legs.

6. A suspension as set forth in claim 1, wherein a wheel holder, to which a wheel mounting bearing the wheel is fastened, is fastened to the web.

7. A suspension as set forth in claim 5, wherein the wheel holder has a carrier on which shock-absorber means are supported, which means support the link on the chassis in a damping manner.

8. A suspension as set forth in claim 1, wherein the torsion-bar suspension has two torsion-bar springs which are connected in series and are arranged coaxially to each other, the first torsion-bar spring being fastened at one end to the link or to the bearing part fixed to the link and being fastened at the other end directly or via a coupling member to one end of the second torsion-bar spring which is fastened by its other end to the chassis or to the bearing part fixed to the chassis.

9. A suspension as set forth in claim 5, wherein the torsion-bar suspension has two torsion-bar springs which are connected in series and are arranged coaxially to each other, the first torsion-bar spring being fastened at one end to the link or to the bearing part fixed to the link and being fastened at the other end directly or via a coupling member to one end of the second torsion-bar spring which is fastened by its other end to the chassis or to the bearing part fixed to the chassis.

10. A suspension as set forth in claim 8, wherein the at least one torsion-bar spring is of tubular design and surrounds the other torsion-bar spring concentrically.

11. A suspension as set forth in claim 9, wherein the at least one torsion-bar spring is of tubular design and surrounds the other torsion-bar spring concentrically.

12. A suspension as set forth in claim 1, wherein a torsion-bar stabilizer made of fiber composite is provided, which stabilizer is of tubular design, extends coaxially to the pivot axis, surrounds the torsion-bar suspension concentrically, and is fastened at one end to the link or to the bearing part fixed to the link and is fastened at the other end to a link, or to a bearing part fixed to the link, of a second wheel suspension which is of corresponding construction and is arranged lying opposite on the same vehicle axle.

13. A suspension as set forth in claim 5, wherein a torsion-bar stabilizer made of fiber composite is provided, which stabilizer is of tubular design, extends coaxially to the pivot axis, surrounds the torsion-bar suspension concentrically, and is fastened at one end to the link or to the bearing part fixed to the link and is fastened at the other end to a link, or to a bearing part fixed to the link, of a second wheel suspension which is of corresponding construction and is arranged lying opposite on the same vehicle axle.

14. A suspension as set forth in claim 1, wherein the link is designed as a longitudinal link which extends essentially parallel to the longitudinal axis (X) of the vehicle, and in that the pivot axis runs parallel to the transverse axis (Y) of the vehicle.

15. A suspension as set forth in claim 5, wherein the link is designed as a longitudinal link which extends essentially parallel to the longitudinal axis (X) of the vehicle, and in that the pivot axis runs parallel to the transverse axis (Y) of the vehicle.

16. A suspension as set forth in claim 14, wherein the wheel is held on the web in such a manner that a wheel axis about which the wheel rotates is at a distance (e) from the web in the longitudinal direction (X) of the vehicle.

17. A suspension as set forth in claim 15, wherein the wheel is held on the web in such a manner that a wheel axis about which the wheel rotates is at a distance (e) from the web in the longitudinal direction (X) of the vehicle.

18. A suspension as set forth in claim 1, wherein the motor vehicle is a passenger car.

19. A suspension as set forth in claim 3, wherein the spring legs are configured as at least one of rectangular leaf springs, parabolic leaf springs, hyperbolic leaf springs and tapered leaf springs.

20. A suspension as set forth in claim 4, wherein the spring legs are configured as at least one of rectangular leaf springs, parabolic leaf springs, hyperbolic leaf springs and tapered leaf springs.

21. A suspension for a wheel in a motor vehicle, comprising:
 a link having a first end and a second end, the link mounted on the first end on a chassis of the vehicle by a mounting, the second end being configured to hold the wheel, the mounting including a bearing having a first bearing part fastened to the chassis and a second bearing part fastened to the link, the first bearing part being adjustably mounted relative to the second bearing part and being pivotable about a pivot axis; and
 a spring arrangement formed of fiber composite and configured to support the link on the chassis in a resilient manner, the spring arrangement including a torsion-bar suspension extending coaxially to the pivot axis, the torsion-bar suspension having a first end fastened to one of the chassis and the first bearing part and a second end fastened to one of the link and the second bearing part;
 wherein the link is formed of fiber composite and is configured as a leaf-spring suspension, the leaf-spring suspension having a U-shaped configuration and including two spring legs extending essentially equidistantly from each other, each spring leg including a first end fastened to the second bearing part and a second end connected to each other via a web on which the wheel is held.

22. A suspension as set forth in claim 21, wherein at least one of the leaf-spring suspension and the spring legs includes an S-shaped precurvature configured to extend the link when the wheel is loaded vertically and to shorten the link when the wheel is relieved of load.

23. A suspension as set forth in claim 21, wherein the spring legs of the leaf-spring suspension are configured in some areas as carriers that are subject to bending and have the same direct bending stress.

24. A suspension as set forth in claim 22, wherein the spring legs of the leaf-spring suspension are configured in some areas as carriers that are subject to bending and have the same direct bending stress.

25. A suspension as set forth in claim 21, wherein at least one strut-like supporting element is arranged between the spring legs, the supporting element being pivotably mounted on each spring leg about a spindle extending perpendicularly to a longitudinal direction of the spring leg, the supporting element extending longitudinally between the spring legs perpendicularly to a longitudinal extent of the spring legs.

26. A suspension as set forth in claim 21, further comprising a wheel holder fastened to the web, the wheel holder being configured to be fastened to a wheel mounting bearing the wheel.

27. A suspension as set forth in claim 26, wherein the wheel holder includes a carrier configured to support a shock-absorber arrangement, the shock-absorber arrangement configured to dampingly support the link on the chassis.

28. A suspension as set forth in claim 21, wherein the torsion-bar suspension includes two torsion-bar springs connected in series and arranged coaxially to each other, a first torsion-bar spring having a first end fastened to one of the link and the second bearing part and a second end fastened one of directly and via a coupling member to a first end of a second torsion-bar spring, a second end of the second torsion-bar spring being fastened to one of the chassis and the first bearing part.

29. A suspension as set forth in claim 25, wherein the torsion-bar suspension includes two torsion-bar springs connected in series and arranged coaxially to each other, a first torsion-bar spring having a first end fastened to one of the link and the second bearing part and a second end fastened one of directly and via a coupling member to a first end of a second torsion-bar spring, a second end of the second torsion-bar spring being fastened to one of the chassis and the first bearing part.

30. A suspension as set forth in claim 28, wherein at least one of the torsion-bar springs has a tubular configuration and concentrically surrounds another one of the torsion-bar springs.

31. A suspension as set forth in claim 29, wherein at least one of the torsion-bar springs has a tubular configuration and concentrically surrounds another one of the torsion-bar springs.

32. A suspension as set forth in claim 21, further comprising a torsion-bar stabilizer made of fiber composite, the stabilizer having a tubular configuration, extending coaxially to the pivot axis and concentrically surrounding the torsion-bar suspension, the stabilizer having a first end fastened to one of the link and the second bearing part and having a second end fastened to one of a link and a second bearing part of a second wheel suspension having a corresponding construction to the suspension and arranged opposite on a same vehicle axle.

33. A suspension as set forth in claim 25, further comprising a torsion-bar stabilizer made of fiber composite, the stabilizer having a tubular configuration, extending coaxially to the pivot axis and concentrically surrounding the torsion-bar suspension, the stabilizer having a first end fastened to one of the link and the second bearing part and having a second end fastened to one of a link and a second bearing part of a second wheel suspension having a corresponding construction to the suspension and arranged opposite on a same vehicle axle.

34. A suspension as set forth in claim 21, wherein the link is configured as a longitudinal link extending essentially in parallel to a longitudinal axis of the vehicle and wherein the pivot axis extends in parallel to a transverse axis of the vehicle.

35. A suspension as set forth in claim 25, wherein the link is configured as a longitudinal link extending essentially in parallel to a longitudinal axis of the vehicle and wherein the pivot axis extends in parallel to a transverse axis of the vehicle.

36. A suspension as set forth in claim 34, wherein the web is configured to hold the wheel so that a wheel axis about which the wheel is rotatable is arranged at a distance from the web in the longitudinal direction of the vehicle.

37. A suspension as set forth in claim 35, wherein the web is configured to hold the wheel so that a wheel axis about which the wheel is rotatable is arranged at a distance from the web in the longitudinal direction of the vehicle.

38. A suspension as set forth in claim 21, wherein the motor vehicle is a passenger car.

39. A suspension as set forth in claim 23, wherein the spring legs are configured as at least one of rectangular leaf springs, parabolic leaf springs, hyperbolic leaf springs and tapered leaf springs.

40. A suspension as set forth in claim 24, wherein the spring legs are configured as at least one of rectangular leaf springs, parabolic leaf springs, hyperbolic leaf springs and tapered leaf springs.

* * * * *

UNITED STATES PATENT AND TRADEMARK OFFICE
CERTIFICATE OF CORRECTION

PATENT NO. : 6,382,649 B1
DATED : May 7, 2002
INVENTOR(S) : Albers et al.

It is certified that error appears in the above-identified patent and that said Letters Patent is hereby corrected as shown below:

Column 1,
Line 45, change "Wheel" to -- wheel --; and

Column 3,
Line 49, change "For a this" to -- For this --.

Signed and Sealed this

Fourth Day of February, 2003

JAMES E. ROGAN
*Director of the United States Patent and Trademark Office*